United States Patent [19]

Stiles

[11] 4,365,865
[45] Dec. 28, 1982

[54] HYBRID CABLE CONSTRUCTION

[75] Inventor: Kenneth M. Stiles, San Dimas, Calif.

[73] Assignee: Sea-Log Corporation, Pasadena, Calif.

[21] Appl. No.: 229,663

[22] Filed: Jan. 30, 1981

[51] Int. Cl.³ .............................................. G02B 5/16
[52] U.S. Cl. ................................ 350/96.23; 174/70 R
[58] Field of Search .................... 350/96.23; 174/70 R

[56] References Cited

U.S. PATENT DOCUMENTS

| 3,865,466 | 2/1975 | Slaughter | 350/96.23 |
| 4,278,835 | 7/1981 | Jackson | 350/96.23 X |
| 4,317,000 | 2/1982 | Ferer | 350/96.23 X |
| 4,342,500 | 8/1982 | Oestreich et al. | 350/96.23 |

*Primary Examiner*—Paul L. Gensler
*Attorney, Agent, or Firm*—Christie, Parker & Hale

[57] ABSTRACT

There is provided a hybrid cable comprised of a plurality of optical fibers and metal conductors wound at a common lay angle. At least the metal conductors are sheathed by a fiber-reinforced resin and are prevented thereby from hockling.

11 Claims, 1 Drawing Figure

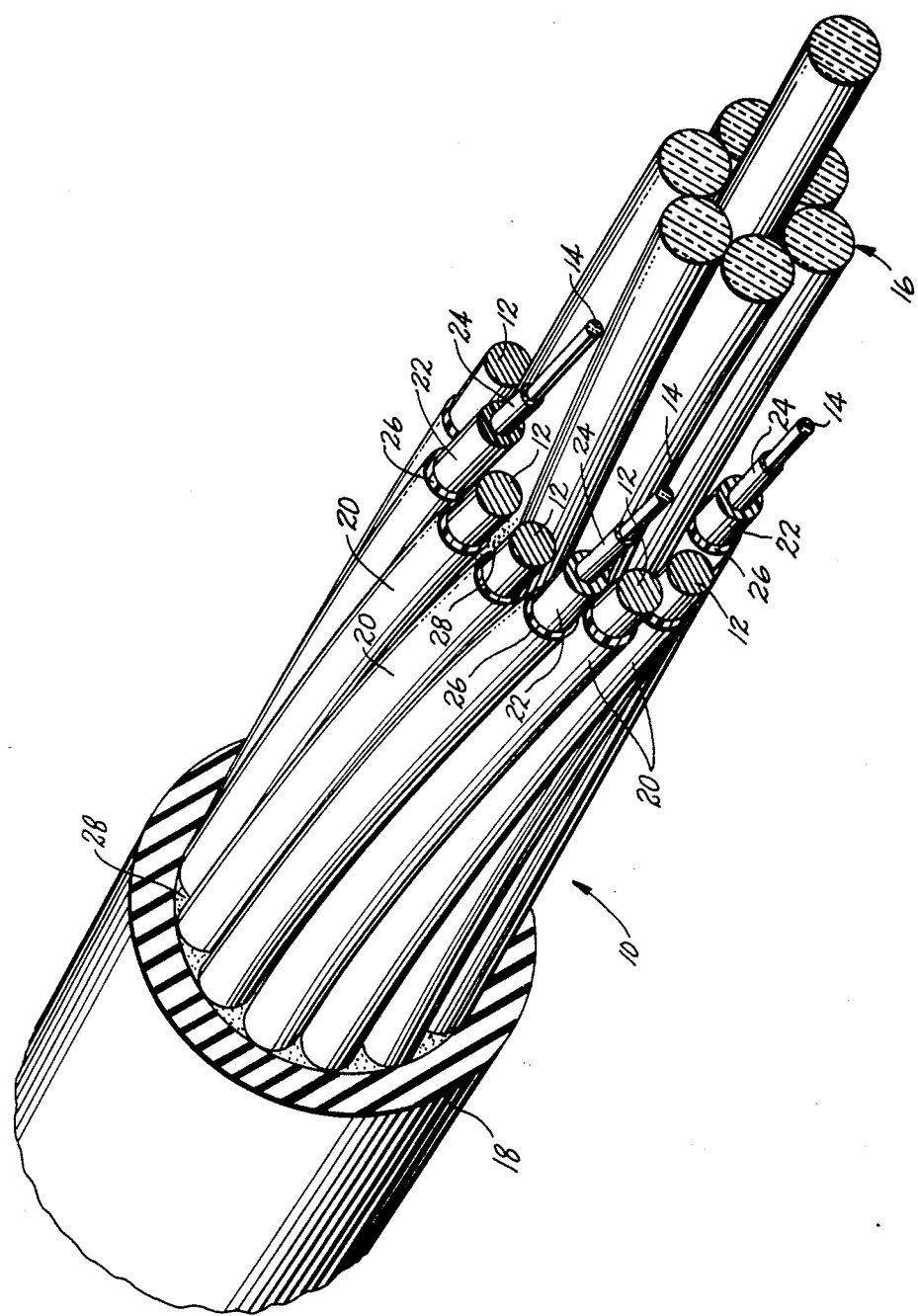

HYBRID CABLE CONSTRUCTION

BACKGROUND OF THE INVENTION

In the manufacture of cable containing both electrical and optical fiber conductors used as mutually exclusive channels, the optical fiber and conventionally insulated metal conductors are helically wound to enable flexing of the cable without creating undue stresses on any one of the component metal conductors or optical fibers. Two opposing constraints, however, have prevented the production of satisfactory cables with small diameter. The optical fibers are restricted to bends having a radius of curvature greater than about 5 centimeters for efficient operation. In a small-diameter cable, this requires a long lay at a small angle to the axis of the cable. Metal conductors, by contrast, require a short lay with a relatively large angle to the axis of the cable. This is necessary to minimize the possibility of exceeding, during flexure of the cable, the elastic limit of the metal conductor. If the elastic limit of the metal conductor is exceeded, the individual conductors will hockle after the stresses are removed. Hockling occurs because the metal conductors are not restrained and are easily stretched to and beyond their elastic limit. Once hockling occurs, any further flexure of the cable would tend to break the hockled conductor and render the affected conductor, and possibly the whole cable, useless.

A need exists, therefore, for an assembly which enables the fabrication of small-diameter hybrid cables that are flexible and yet immune to hockling of the contained metal conductors.

SUMMARY OF THE INVENTION

It has now been found that hybrid cables consisting, in part, of helically-wound optical fibers and, in part, of helically-wound metal conductors, can be fabricated to have a common pitch diameter and angle of lay to the axis of the cable, provided that metal conductors are contained in an adherent sheath of a non-metal fiber-reinforced resin, in which the sheath in modulus of elasticity is substantially the same as the optical fiber. In the construction, the fiber-reinforced resin sheath about the metal conductor resists stretching of the metal conductor and restores it to its original shape if stretched beyond its elastic limit.

In particular, the hybrid cable construction of this invention provides an axis and comprises a plurality of optical fibers helically wound with a plurality of ruggedized metal conductors comprising a metal core surrounded by an adherent sheath formed of a non-metal fiber-reinforced resin in which the optical fibers and ruggedized metal conductors are wound in the cable to substantially the same lay angle which satisfies the expression:

$$R_c = \frac{\text{Pitch Diameter}}{2(\sin \theta)^2} \qquad \text{I}$$

wherein $R_c$ equals the radius of curvature of any given winding of the cable; pitch diameter is the cable diameter at the winding; and $\theta$ equals the angle of lay to the axis of the cable. The radius of curvature is at least about 5 centimeters.

In the preferred construction, the optical fibers are provided with a sheath, preferably of the same construction as the sheath about the metal conductors. The preferred sheaths are those in which the fibers are glass or aromatic polyamide fibers, i.e., "Kevlar" resins manufactured and sold by DuPont de Nemours & Co., and in which the resin is a thermoset epoxy resin.

In the construction, the adherent sheath surrounding the metal conductor is the controlling factor and prevents, within the body of the cable itself, the metal conductors from stretching more than the sheath. This eliminates any tendency of the conductor to deviate from its original shape and curvature, and also serves as electrical insulation for the conductor.

THE DRAWING

The attached Drawing illustrates a hybrid cable construction provided in accordance with the instant invention.

DETAILED DESCRIPTION

With reference to the Drawing, a cable construction employing the invention consists of cable 10 formed in part of helically-wound metal conductors 12 and optical fibers 14. The conduits are, as shown, about a load-supporting core of glass fibers 16 wound in a direction opposite to the layer of optical fibers and electrical conductors. Any additional layers would be alternately wound with opposite twists. Surrounding the conductors and core is an exterior sheath 18. Surrounding each metal conductor 12 is an adherent sheath 20 formed of a fiber-reinforced resin matrix. Optical fibers 12 are preferably surrounded by sheath 22, which is desirably formed of a fiber-reinforced resin matrix the same as that employed in sheath 20 surrounding conductor 12. The use of identical sheath construction insures both sheaths will have a substantially identical modulus of elasticity to achieve maximum mutual compatibility in the helical cable construction. This is important, as the physical properties of the sheaths of both the optical fibers and the metal conductors will control the physical properties and handling characteristics of the cable.

Although it is not necessary for the optical fibers to be sheathed, the optical fibers are preferably protected by a sheathing system. To this end, it is preferred that the fiber-reinforced resin sheath 22 surround an essentially annular coating 24 of an elastomer having a higher coefficient of thermal expansion than the sheath 22. Coating thickness is usually at least 3, and preferably from 5 to about 10 mils. It is preferred that the elastomer be a cured, room-temperature, vulcanizable silicone rubber having a coefficient of expansion of $30 \times 10^{-5}$ in./in./°C., as measured by ASTM D-696, and may range from about $20 \times 10^{-5}$ to about $30 \times 10^{-5}$ in./in./°C. or more. A particularly preferred material is a room-temperature, vulcanizable rubber having a Shore-A hardness of about 35. Surrounding the elastomer coating 24 is a fiber-reinforced resin outer shell 22 which, as shown, is protected by an outer cushion 26, preferably formed of an elastomeric material such as polypropylene.

In the assembly, the fiber-reinforced resin outer shell 22 contacts the elastomer 24, but is prevented by the elastomer 24 from imposing within the normal range of ambient temperatures, radial compressive loads on the optical fiber 14. This is achieved by setting of the resin while the elastomer is in a thermally expanded state.

Although the resin employed for sheaths 20 and 22 may be of a thermoplastic of suitable strength and hardness, it is preferred to employ a thermoset resin. Fibers used for reinforcement are non-conductive, and include glass fibers, high-strength organic fibers such as Kevlar TM, high-modulus fibers, and Aramid TM fibers; carbon fibers and the like. Although a variety of fiber orientations may be used, maximum performance is achieved where the fibers parallel the axis of the optical fiber or conductor they surround, as this maximizes tensile strength. Thermosetting resins are preferred to provide the sheath having a maximum modulus of elasticity, to render it most compatible with the modulus of elasticity of the optical fiber which it contains. The nature of the thermosetting resin may be varied widely and may include, amongst others, epoxy resins, such as epoxidized cyclopentadiene, polyesters, phenolformaldehyde resins, ureaformaldehyde resins, diallyl phthalate resins, silicone resins, phenol-furfural resins, urethane resins, melamine resins, and the like. If employed, useful thermoplastic resins are those which have a high softening temperature to allow setting of the sheath while the elastomer coating is thermally expanded. Among the thermoplastics which may be mentioned are acrylonitrile-styrene-butadiene, acetal homopolymers and copolymers, acrylics, alkyl resins, butadiene-styrene, nylons, polysulfones, polycarbonates, polystyrene, vinyl resins and the like. Whichever resin is employed, the sheath which includes the resin, fibers, and fillers, colors, etc., must have a coefficient of thermal expansion less than the elastomer, and in the preferred construction, the cured silicone rubber. Preferably, the ratio of coefficient of expansion of the elastomer coating to the sheath should be from 30:1 to about 3:1. Preferred optical fibers used in the cable construction of this invention are described in greater detail in U.S. Pat. No. 4,113,349, issued to me and incorporated herein by reference.

The sheath 24, when employed about the optical fiber, provides to the optical fiber the abrasion resistance, buckling resistance, rupture resistance, and a tensile strength indigenous to the nature of materials used in construction of the sheath, and protects against the optical fiber from being subject to compressive pressures which may otherwise be imposed on the optical fiber in the process of cable manufacture or use.

Independent of whether the optical fiber is sheathed, the core of the metallic conductor 12 is. The sheathing materials which may be used in applying a sheath to the core are the same as those for applying a sheath to the optical fiber. To facilitate stripping for end use, the adhesion, while required, may be sufficiently weak to permit manual stripping of the sheath from the metal core, but yet sufficient to prevent cohesive separation of the core from the sheath during normal cable use. Adhesion may be achieved by contact with the resin of the sheath with the cable itself during conduit formation, or if the resin will not wet the metal of the core, by the use of primers, coupling agents or both. The metal of the core is normally copper or aluminum.

Where thermosetting resins are employed, sheathing may be formed about the cables by the methods described in U.S. Pat. No. 4,168,194, U.S. application Ser. No. 33,800, filed Apr. 26, 1979, now U.S. Pat. No. 4,285,749 and U.S. application Ser. No. 161,426, filed June 20, 1980, now U.S. Pat. No. 4,305,770 each incorporated herein by reference. The sheathing procedure involves a pultrusion method. The process of this method comprises, under tension, first coating a plurality of continuous fibers spaced in relationship with each other with a molten heat-curable thermosetting composition, the resin being sufficiently liquid to at least partially coat the fibers, but maintained at a temperature below that at which cure will be initiated. The resin-coated fibers may then be directly brought about the core, whether the metallic core or the elastomer-coated optical fiber core, and advanced to a first shaping die. Preferably, however, the coated fibers are combined in contiguous relation and passed through an excess resin removal zone, then spread apart and passed through a pre-heated zone in spaced relation. There, the spaced fibers are heated by at least one radiant heating surface, spaced from the fibers to achieve a reduction of resin viscosity, then combined with the core, either the metal conductor or optical fiber, and passed through a first shaping die. The assembly is then passed through a plurality of elongated radiant heating zones in series, each providing at least one heated surface, the surfaces of the heating zones being spaced from the assembly of core- and resin-impregnated fibers, the radiant heating zones of the series being separated from each other by at least one cold shaping die, each die being narrow, relative to the length of the radiant heating zones. In each radiant heating zone, the resin is heated by radiation and convection to a temperature sufficient to reduce viscosity of the resin, preferably to below its initially applied viscosity. This makes the resin more mobile to achieve wetting of the fibrous structure as an aid in shaping to the final structure. Resin temperature achieved in each heating zone is sufficient to partially cure the resin, which increases the viscosity sufficient to prevent resin from draining from the fibrous surfaces.

The shaping dies are maintained at a temperature substantially below the temperature at which curing of the resin is initiated. Passing through the orifices of each die, the resin and fiber are progressively formed into the desired cross-sectional configuration of the sheath, with attendant expulsion of excess resin. This maximizes radial compression of the fibers with respect to each other and about the core. The dies are maintained at a temperature sufficiently low such that cure of expelled resin within the die or on the die surface will not be promoted, and can be readily blown from the surface of the die.

The process is continued until the gel point of the resin is reached. The gel point is the point where the viscosity can no longer be reduced by application of heat, and where cure will be accelerated with large exotherm. This is delayed until just before the last die. At this point, the resin is in a firm gel state, where the structure retains its configuration and remains workable to a degree to enable excess resin to flow and be removed from the surface in the final shaping die.

Although a radiant heating oven may be employed to achieve final cure, it is preferred that the shaped fiber-reinforced structure, when it is provided with a hard-gelled surface, be passed through either a molten metal bath or through a mass of heated particles maintained at a temperature from 95° C. to the thermal degradation temperature of the resin, for a time sufficient to achieve essentially complete cure of the resin. This will prevent the fiber-reinforced resin structure from assuming the shape of storage rolls as a consequence of final cure prior to winding the cable on a storage reel.

In addition, the metallic core, usually copper or aluminum, may be inductively heated during the sheathing operation to facilitate cure from within the structure.

In the forming of the hybrid cables of the invention, any number of sub-assemblies of the sheathed optical fibers and/or metal conductor, the latter consisting of a plurality of twisted conductors or a single metal conductor, are played out from reels and formed by conventional means, interse or with reinforcement, into a twisted cable. Each layer of forming the assembly has a twist opposite the previous layer and, when completed, is coated with a jacket 18, normally applied by an extrusion coating process. Elastomeric cushioning materials 28 may be present. In the cable, the individual strands of each layer are at a lay angle accommodative to maximizing performance of the optical fiber. The metal conductor is at the same lay and assumes the same environment as the optical fiber. It is not, however, during flexing and stressing, caused to hockle because of the existence about the conductor of a fiber-reinforced resin sheath.

For a given assembly, the lay angles of the sheathed optical fibers and metal conductors are the same and are governed by the formula:

$$R_c = \frac{\text{Pitch Diameter}}{2(\sin \theta)^2} \quad \text{I}$$

wherein $R_c$ equals the radius curvature of a given winding, whether sheathed optical fiber or metal conductor; pitch diameter is the cable diameter at the winding, and $\theta$ equals the angle of lay to the axis of the cable. In the construction, the radius of curvature is at least about 5 centimeters.

EXAMPLE 1

There was maintained a liquid, heat-curable, resin bath comprised of 100 parts by weight Epoxy Resin 826 manufactured and sold by Shell Chemical Company, 26 parts by weight of an hardener known as Jeffamine 230 manufactured and sold by Jefferson Chemical Company, and 6 parts by weight of an accelerator, Accelerator-398 manufactured and sold by Jefferson Chemical Company. Bath temperature was maintained at 22° C. To reinforce-coat a copper wire, strands of a glass fiber known as S-901 manufactured and sold by Owens Corning Corporation, were drawn through the bath at a rate of 12 feet per minute. The resin-coated glass fibers were then passed through a first radiant pre-heating chamber maintained at 93° C. to achieve a first viscosity reduction of the resin. The length of the pre-heating chamber was 8 feet. The wire was centrally introduced to the glass fiber-resin matrix and with the surrounding glass fibers and resin was drawn through a first die at a temperature of 65° C., and then through a second radiant heating zone of 6 feet in length maintained at 175° C. to achieve a second viscosity reduction in the binding resin. The heated preformed cable was then drawn through a second die, again at a temperature of 65° C., as induced by the drawn matrix. The resin had reached the gel point at the second die. After passage through the second cold shaping die, the gelled resin-impregnated glass-fiber-reinforced wire was passed through a post-curing chamber maintained at 175° C. Chamber length was 12 feet. Following cure, the product, having a diameter of about 0.050 inch, was wound onto a reel.

EXAMPLE 2

There was coated, using the resin system of Example 1, 28 ends of Owens Corning S-901, each containing about 201 glass filaments, and passed through the resin bath at the rate of 12 feet per minute. After the initial coating, the resin and fibers were passed over a squeegee roll to the extent of providing fibers containing from about 25 to 30% by weight resin, based on the weight of resin and fibers. The resin-impregnated fibers were then passed through a first radiant preheating zone maintained at a temperature of about 110° C. The preheating zone, as were all subsequent heating zones, was constructed of a "U"-shaped channel, 4 inches wide across the base, and having 2-inch-high sides. Heat was provided by thermostatically controlled heating tapes along the length of the channel and covered by an aluminum plate. The zone was closed at the top by a removable aluminum lid. The radiant pre-heating zone was 8 feet long.

After emerging from the preheating zone, an optical fiber of 5.0 mil diameter buffered to a thickness of 20 mils with a room-temperature cured silicone rubber by the method as described in my U.S. application Ser. No. 600,202, filed July 30, 1975, and incorporated herein by reference, was added using two guide grids in series. The guide grids centered the buffered optical fiber, which became surrounded by the resin-coated fibers. The combination was drawn through a first cold shaping die having an orifice of 0.048 inch in diameter, and the first of five additional radiant heating zones, having the same construction as the preheating zone but of a length of about 30 inches. The cold shaping die, after the first of the radiant heating zones, had an orifice of 0.044 inch in diameter, and the orifice openings of the remaining dies were 0.04 inch. Spacing between heating zones was about 6 inches, between which the die was positioned. Radiation and convection adjacent heating zones maintained die surfaces at about 66° C. Internal heating zone temperature of each of the five radiant heating zones was about 171° C. The resin reached a gel point just prior to the last die. In the process, about 20% by weight of the resin was removed from the structure, leaving a final structure containing from about 22 to about 25% by weight resin, based on the weight of resin and fibers. The structure was passed to a curing zone of the cross-sectional configuration and structure, as described above, and maintained at 177° C. The length of the curing zone was 28 feet. Using the operation, glass-fiber ruggedized-buffer optical fibers were produced.

EXAMPLE 3

Sheathed copper wire conductors of Example 1 and sheathed optical fiber conductors of Example 2, coated with polypropylene to a diameter of 0.072 inch, were twisted about a core of seven 0.085-inch-diameter glass-core elements. A polyurethane elastomer was coated about the core and about the twisted sheathed optical fibers and sheathed copper conductors, which formed an annulus about the glass core of 0.400 inch. The annulus was surrounded by elastomer and an outer jacket to a diameter of 0.50 inch. Repeated flexing of the cable did not result in hockling or loss of electrical or optical continuity.

EXAMPLE 4

To demonstrate the new integrity imparted to a metal conductor by application of a structural glass-fiber reinforced resin sheath about the wire, there were conducted field tests to determine if a construction would elongate and recover without permanent set or loss of electrical continuity. In a test setup, a 10- to 12-foot length of a glass-fiber-reinforced epoxy resin structure about a wire was wrapped about a 12-inch sheave, with one end of the sample clamped to the sheave. The other end of the sample was secured to a similar sheave in like manner, and an approximately 3-foot gauge length was maintained between sheaves. One sheave was then fixed, while the second sheave was secured to the lever arm of a lever system between the fulcrum and the point of loading. The lever was then loaded with dead weights until the desired strain was measured in a 10-inch gauge length of the ruggedized wire exposed between the sheaves. The dead-weight load was then lifted and lowered by an eccentric cam and belt to relieve and apply the desired strain to the test wire. The cycles in tension fatigue were obtained by multiplying the RPM of the eccentric cam by the time duration of the test in minutes. Electrical continuity was monitored during the tensile-fatigue test periods by means of an ohmmeter.

The first cable contained #28 copper wire ruggedized with "S" glass to 0.037-inch diameter, tensile-fatigued to 2,000 cycles at 1% strain, followed by 3,000 cycles at 1.5% strain. No loss of electrical continuity during the test or afterwards was observed. No permanent set of the electrical conductor or the ruggedizing annulus was observed.

EXAMPLE 5

The test was repeated for a #28 copper wire sheathed with 7 strands of a 380-denier Kevlar resin, an aromatic polyamide resin manufactured and sold by DuPont, bound by an epoxy resin. The overall diameter of the net cable was 0.030 inch. Again, no loss of electrical continuity, during the test or otherwise, was observed. No permanent set of the electrical conductor of the ruggedizing annulus was observed after the test.

EXAMPLE 6

A strand of #30 Alstrand 1350 aluminum wire, ruggedized with 32 ends of "S" glass and an epoxy resin to the diameter of 0.035 inch, was tensile-fatigued at 2,000 cycles at 1% strain, followed by 3,000 cycles at 1.5% strain. No loss of electrical continuity was observed during or after the test. No permanent set of the aluminum conductor or its ruggedizing annulus was observed after the test.

It was concluded that application of a sheath with structural fibers and epoxy resin about an electrically conductive wire caused the electrical conductor to survive repeated strains beyond its normal yield point without an observable permanent set or loss of electrical continuity.

What is claimed is:

1. A hybrid cable construction having an axis and windings which comprises a plurality of optical fibers helically wound with a plurality of sheathed metal conductors formed of a metal core surrounded by an adherent sheath of fiber-reinforced resin, the optical fibers and sheathed metal conductors wound in the cable to a lay angle which substantially satisfies the expression:

$$R_c = \frac{\text{Pitch Diameter}}{2(\sin \theta)^2}$$

wherein
$R_c$ = radius of curvature of a given winding of the cable and is greater than 5 cm;
Pitch Diameter = diameter of the cable at a given winding; and
$\theta$ = lay angle of a winding to the axis of the cable.

2. A hybrid cable construction as claimed in claim 1 in which the fibers of the fiber-reinforced resin are fibers selected from the group consisting of glass and aromatic polyamide fibers.

3. A hybrid cable construction as claimed in claim 1 in which the resin of the fiber-reinforced resin is a thermoset epoxy resin.

4. A hybrid cable construction as claimed in claim 2 in which the resin of the fiber-reinforced resin is a thermoset epoxy resin.

5. A hybrid cable construction having an axis and windings which comprises a plurality of optical fibers, each optical fiber surrounded by a sheath of fiber-reinforced resin and helically wound with a plurality of metal conductors, each metal conductor surrounded by an adherent sheath of a fiber-reinforced resin, the optical fibers surrounded by sheaths and the metal conductors surrounded by sheaths wound in the cable to a lay angle which substantially satisfies the expression:

$$R_c = \frac{\text{Pitch Diameter}}{2(\sin \theta)^2}$$

wherein
$R_c$ = radius of curvature of a given winding of the cable and is greater than 5 cm;
Pitch Diameter = diameter of the cable at a given winding; and
$\theta$ = lay angle of a winding to the axis of the cable.

6. A hybrid cable construction as claimed in claim 5 in which the resin of the sheath of the optical fiber and the resin of the sheath of the metal conductor are the same resin.

7. A hybrid cable construction as claimed in claim 6 in which the resin is a thermoset epoxy resin.

8. A hybrid cable construction as claimed in claim 5 in which the fibers of the sheath of the optical fiber and the fibers of the sheath of the metal conductor are the same.

9. A hybrid cable construction as claimed in claim 8 in which the fibers are fibers selected from the group consisting of glass and aromatic polyamide fibers.

10. A hybrid cable construction as claimed in claim 6 in which the fibers of the sheath of the optical fiber and the fibers of the sheath of the metal conductor are the same.

11. A hybrid cable construction as claimed in claim 10 in which the resin is a thermoset epoxy resin.

* * * * *